(12) United States Patent
Lee et al.

(10) Patent No.: US 9,019,303 B2
(45) Date of Patent: Apr. 28, 2015

(54) METHOD OF PROCESSING IMAGE AND APPARATUS FOR THE SAME

(75) Inventors: Seung Yong Lee, Gyeongbuk (KR); Yun Jin Lee, Gyeonggi-do (KR); Min Jung Son, Gyeongbuk (KR); Henry Kang, St. Louis, MO (US)

(73) Assignee: Postech Academy—Industry Foundation, Gyeongbuk (KR)

( * ) Notice: Subject to any disclaimer, the term of this patent is extended or adjusted under 35 U.S.C. 154(b) by 596 days.

(21) Appl. No.: 13/266,047

(22) PCT Filed: May 26, 2011

(86) PCT No.: PCT/KR2011/003880
§ 371 (c)(1),
(2), (4) Date: Oct. 24, 2011

(87) PCT Pub. No.: WO2012/108587
PCT Pub. Date: Aug. 16, 2012

(65) Prior Publication Data
US 2012/0200591 A1    Aug. 9, 2012

(30) Foreign Application Priority Data

Feb. 8, 2011 (KR) .................... 10-2011-0010978

(51) Int. Cl.
*G09G 5/00* (2006.01)
*G06T 11/00* (2006.01)
*G06T 11/20* (2006.01)

(52) U.S. Cl.
CPC ............ *G06T 11/001* (2013.01); *G06T 11/20* (2013.01)

(58) Field of Classification Search
CPC ................ G06T 19/00; G06T 17/20
USPC .................................. 345/619, 620
See application file for complete search history.

(56) References Cited

U.S. PATENT DOCUMENTS

2011/0187720 A1* 8/2011 Pedersen ..................... 345/442
2013/0120393 A1* 5/2013 Winnemoeller et al. ...... 345/441

OTHER PUBLICATIONS

S. Kim, I. Woo, R. Maciejewski, D.S. Ebert, Automated hedcut illustration using isophotes, in: Proceedings of Smart Graphics 2010, LNCS, vol. 6133, 2010, pp. 172-183.*
D. Kim, M. Son, Y. Lee, H. Kang, S. Lee, Feature-guided image stippling, Computer Graphics Forum 27 (2008) 1209-1216.*
S. Lee, G. Wolberg, S.Y. Shin, Scattered data interpolation with multilevel b-splines, IEEE Transactions on Visualization and Computer Graphics 3 (1997) 228-244.*
M. Son, et al., "Structure grid for directional stippling," Elsevier, Graphical Models 73 (2011) 72-85, Published Dec. 15, 2010, 14 pages.

* cited by examiner

*Primary Examiner* — Devona Faulk
*Assistant Examiner* — Jin Ge
(74) *Attorney, Agent, or Firm* — Osha Liang LLP

(57) ABSTRACT

Provided are a method of generating a resulting image as if drawn by an artist and an apparatus for executing the method. The apparatus includes a first generation unit configured to generate a vector field expressing a shape of an image using feature pixels of the image captured by an image device and direction information of the feature pixels, a second generation unit configured to generate a structure grid indicating a structure for rendering the shape of the image using the vector field, and a rendering unit configured to render primitives expressing predetermined tones on the generated structure grid. Accordingly, it is possible to automatically and rapidly generate a resulting image from one image. Anyone can easily generate a hedcut from one photo without the limitation that a limited number of artists need to invest a great deal of time to complete one hedcut.

24 Claims, 4 Drawing Sheets

METHOD OF PROCESSING IMAGE AND APPARATUS FOR THE SAME

TECHNICAL FIELD

The present invention relates to an image processing method and apparatus, and more particularly to an image processing method and apparatus using a structure grid.

BACKGROUND ART

Hedcut is an artistic technique for expressing a target by arranging dots or lines having different sizes at fixed intervals according to a feature flow of the target to be portrayed. Hedcut has been developed to emulate the look of woodcuts, and is widely used to portray portraits in print media such as newspapers, magazines, or the like. Because a target is portrayed by dots or lines in hedcut, hedcut has an attractive style and is utilized in various fields other than print media. However, because much time is required when a few artists manually generate hedcuts, it is difficult for this hedcut generation method to be widely used.

As features of the hedcut, dots or lines having different sizes are used to express a tone of a target, the dots or lines are arranged along a feature direction, the arranged dots or lines are placed at intervals to a fixed extent, and the dots and lines are mixed in one hedcut image without a sense of incongruity. There is no hedcut generation method satisfying the above-described features in the related art, and studies of stippling and hatching are closely related to the hedcut generation method.

However, there is a problem in that methods based on the stippling and hatching do not sufficiently satisfy the features of a hedcut generated by arranging dots or lines having different sizes in a feature direction and placing the arranged dots or lines at intervals to a fixed extent.

DISCLOSURE OF INVENTION

Technical Problem

A first object of the present invention for solving the above-described problem is to provide an image processing apparatus using a structure grid.

A second object of the present invention for solving the above-described problem is to provide an image processing method using a structure grid.

Technical Solution

According to an example embodiment for achieving the first object of the present invention, there is provided an image processing apparatus including: a first generation unit configured to generate a vector field expressing a shape of an image using feature pixels of the image captured by an image device and direction information of the feature pixels; a second generation unit configured to generate a structure grid indicating a structure for rendering the shape of the image using the vector field; and a rendering unit configured to render primitives expressing predeteiinined tones on the generated structure grid.

According to an example embodiment for achieving the second object of the present invention, there is provided an image processing method to be performed in an image processing apparatus, including: generating a vector field expressing a shape of an image using feature pixels of the image captured by an image device and direction information of the feature pixels; generating a structure grid indicating a structure for rendering the shape of the image using the vector field; and rendering primitives expressing predetermined tones on the generated structure grid.

Advantageous Effects

According to the present invention, it is possible to automatically and rapidly generate a resulting image from one image using a method of generating the resulting image as if drawn by an artist from the one image and an apparatus for executing the method. Anyone can easily generate a hedcut from one photo without the limitation that a limited number of artists need to invest a great deal of time to complete one hedcut.

Also, a feature vector field, a structure grid, a primitive rendering method, and the like defined for the present invention can be respectively independently utilized in various image processing techniques. The feature vector field can be generated to be utilized in various image processing methods based on a direction by generating a vector field smoothly varying over the total image while reflecting direction information defined in part of an image. The structure grid can be utilized in various fields for flow visualization and the like by generating various patterns such as a stripe pattern iterated at fixed intervals according to a vector field, a grid generated by overlapping a plurality of stripe patterns, and the like. A rendering method using the structure grid can become a base of rapidly rendering basic primitives such as dots, lines, or the like on the basis of pixels.

BEST MODE FOR CARRYING OUT THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another.

For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings.

Figure 1:
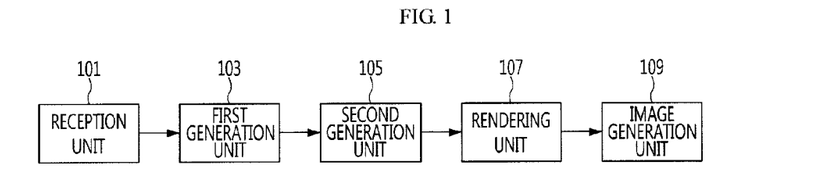
FIG. 1 is a block diagram showing an internal structure of an image processing apparatus according to an embodiment of the present invention.

FIG. 1 is a block diagram showing an internal structure of an image processing apparatus according to an embodiment of the present invention.

Referring to FIG. 1, the image processing apparatus may include a reception unit 101, a first generation unit 103, a second generation unit 105, a rendering unit 107, and an image generation unit 109.

The reception unit 101 receives images captured by a plurality of imaging devices, for example, two-dimensional (2D) images. The first generation unit 103 receives an image from the reception unit 101, generates a feature line map corresponding to feature pixels from the received image, and generates a vector field for the image by defining and interpolating direction information of dots corresponding to the generated feature line map.

Here, the first generation unit 103 interpolates and uses direction information of feature pixels included in a feature line map so as to define direction information of feature pixels excluded from the feature line map. This is soft and stable as compared to the simple use of edge tangent field (ETF) information of all feature pixels included in an image, and can obtain a vector field highly reflecting information of feature portions.

According to an embodiment of the present invention, the first generation unit 103 can generate a vector field for an image by interpolating direction information of dots corresponding to a feature line map using multilevel B-spline interpolation among scattered data interpolation methods.

According to an embodiment of the present invention, the first generation unit 103 can interpolate each term after converting direction information of feature pixels into 2×2 structure tensors so as to process vectors indicating opposite directions, for example, (1, 0) and (−1, 0), in the same direction, calculate eigenvectors of the interpolated structure tensors, and generate a vector field for an image by definition in a direction of each pixel.

The second generation unit 105 generates a structure grid to be used to arrange primitives such as dots, lines, or the like with the feature vector field generated by the first generation unit 103. For example, the second generation unit 105 can generate a structure grid having a grid structure by smooth deformation along the vector field generated by the first generation unit 103.

On this structure, all of stippling, hatching, and a mixture thereof can be expressed by drawing dots at grid intersections and lines on grid lines. Primitives drawn as described above can be arranged at fixed intervals along a feature direction and its vertical direction.

Further, for example, the second generation unit 105 combines a first stripe pattern, which is a result obtained by iteratively synthesizing a stripe pattern according to direction information of feature pixels, and a second stripe pattern, which is a result obtained by iteratively synthesizing the stripe pattern along a vertical direction with respect to the direction information of the feature pixels, thereby generating a structure grid.

The rendering unit 107 renders primitives expressing predetermined tones on the structure grid generated by the second generation unit 105. Here, the primitive rendering is a process of creating a final resulting image by drawing basic primitives such as dots or lines on the structure grid generated by the second generation unit 105. The image generation unit 109 generates a resulting image by adding feature lines to a primitive-rendered result from the second generation unit 105. Hereinafter, a process in which the first generation unit of the image processing apparatus generates a vector field according to an embodiment of the present invention will be described with reference to FIG. 2.

Figure 2:
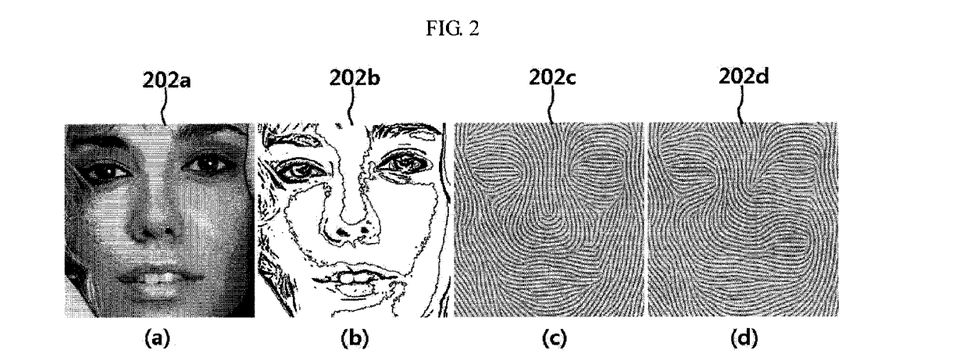
FIG. 2 is an exemplary diagram illustrating a process in which a first generation unit of the image processing apparatus generates a vector field according to an embodiment of the present invention.

FIG. 2 is an exemplary diagram illustrating a process in which the first generation unit of the image processing apparatus generates a vector field according to an embodiment of the present invention.

Referring to FIG. 2, the first generation unit 103 receives an image 202a from the reception unit 101, and generates a feature line map 202b corresponding to feature pixels in the received image. According to an embodiment of the present invention, the first generation unit 103 defines a feature line map using a flow-based line drawing technique (black lines in 202b). The flow-based line drawing technique can effectively express stylized feature lines, and has an advantage in that ETF information of all feature pixels obtained in the step of generating a feature line map can be used as direction information of feature pixels.

The first generation unit 103 defines and interpolates direction information of dots corresponding to the generated feature line map, and generates a vector field 202c or 202d for an image. Here, the vector field 202c is generated by the first generation unit 103 using a feature line map defined by only the flow-based line drawing, and the vector field 202d is generated by the first generation unit 103 additionally using isophote curves.

According to an embodiment of the present invention, the first generation unit 103 can receive an image and generate the vector field 202d additionally using the isophote curves (blue lines in 202b) so that a physical body can be assumed to a certain extent when the received image is a 2D image. The first generation unit 103 can define its boundary as the isophote curve after quantizing brightness information of the received image in steps of which the number is predefined, and generate the vector field 202d using a feature line map after additionally applying feature pixels corresponding to the isophote curve to the feature line map. Hereinafter, a process in which the second generation unit of the image processing apparatus generates a structure grid according to an embodiment of the present invention will be described with reference to FIGS. 3 to 5.

Figure 3:
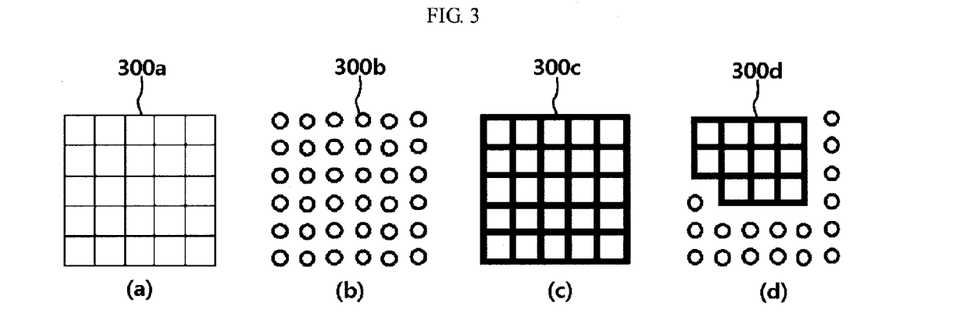
FIGS. 3 to 5 are exemplary diagrams illustrating a process in which a second generation unit of the image processing apparatus generates a structure grid according to an embodiment of the present invention.
Figure 4:
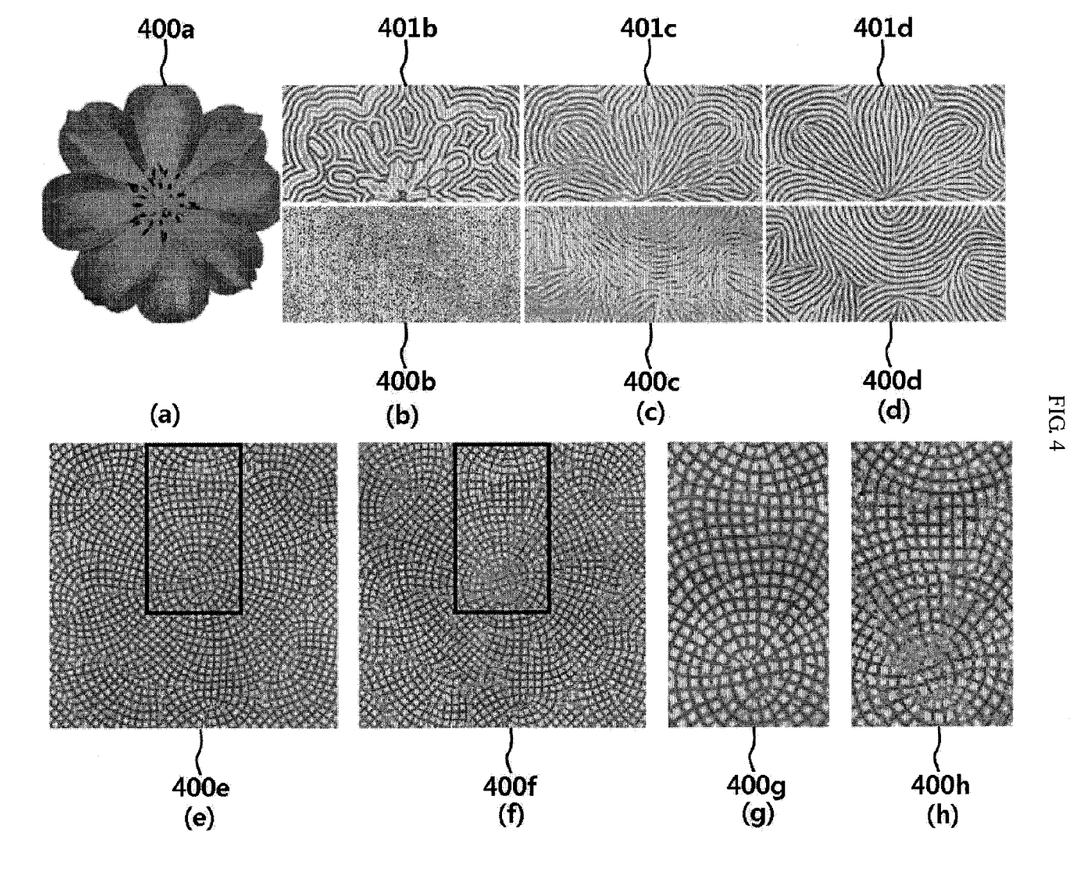
Figure 5:
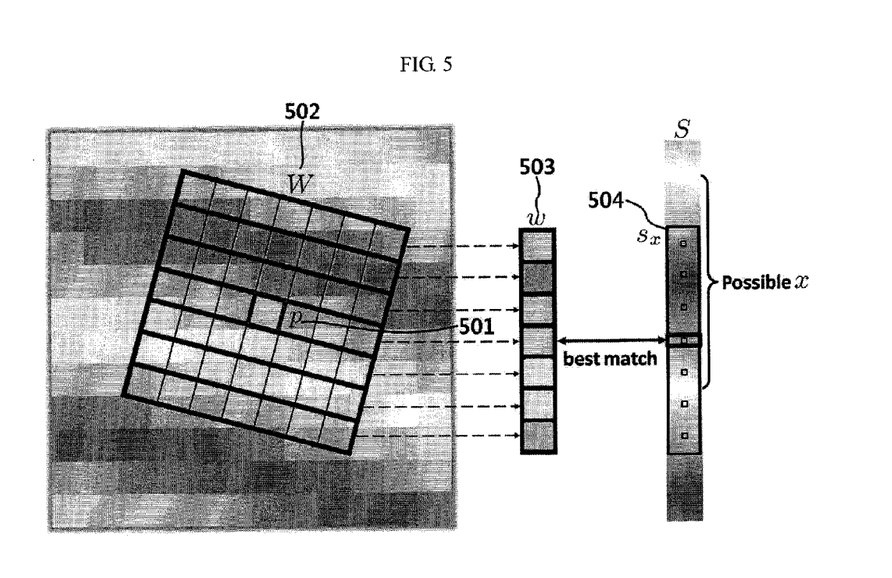

FIGS. 3 to 5 are exemplary diagrams illustrating a process in which the second generation unit of the image processing apparatus generates a structure grid according to an embodiment of the present invention.

Referring to FIG. 3, the second generation unit 105 generates the structure grid using a feature vector field generated by the first generation unit 103. Here, the structure grid is a structure defined to arrange primitives such as dots or lines.

According to an embodiment of the present invention, the second generation unit 105 can generate a structure grid 300a having a grid structure by smooth deformation along the vector field generated by the first generation unit 103.

On this structure, all of stippling 300b, hatching 300c, and a mixture 300d thereof can be expressed by drawing dots at grid intersections and lines on grid lines. Primitives drawn as described above can be arranged at fixed intervals along a feature direction and its vertical direction.

Referring to FIG. 4, the second generation unit 105 generates a structure grid using the feature vector field generated by the first generation unit 103. According to an embodiment of the present invention, the second generation unit 105 can define a grid pattern as an input texture sample and generate structure grids 400f and 400h by texture synthesis of the vector field in a texture rotation direction. However, in this case, some grid intersections or grid lines may be obscured to follow a freely deformed vector field. According to an embodiment of the present invention for solving the above-described problem, the second generation unit 105 combines first stripe patterns 401b, 401c, and 401d, which are results obtained by iteratively synthesizing a stripe pattern according to direction information of feature pixels, and second stripe patterns 400b, 400c, and 400d, which are results obtained by iteratively synthesizing the stripe pattern along a vertical direction with respect to the direction information of the feature pixels, thereby generating structure grids 400e and 400g.

The first stripe patterns 401b, 401c, and 401d show variations according to results obtained by iteratively synthesizing the stripe pattern according to the direction information of feature pixels. While the first stripe pattern 401b, which is a first result obtained by synthesizing the stripe pattern according to the direction information of feature pixels, merely shows distances from feature lines, the first stripe patterns 401c and 401d, which are second and third results obtained by synthesizing the stripe pattern according to the direction information of feature pixels, have improved stripe patterns according to the direction information of feature pixels of each part.

The second stripe patterns 400b, 400c, and 400d show variations according to results obtained by iteratively synthesizing the stripe pattern in a vertical direction with respect to the direction information of feature pixels. While the second stripe pattern 400b, which is a result obtained by iteratively synthesizing the stripe pattern in the vertical direction with respect to the direction information of feature pixels, seems to have initial random values with no relation, the stripe patterns can be found from the second stripe patterns 400c and 400d, which are second and third results obtained by synthesizing the stripe pattern in the vertical direction with respect to the direction information of feature pixels. As described above, the second generation unit 105 can generate the final structure grids 400e and 400g by combining the stripe patterns generated in vertical directions to each other twice, for example, the first stripe pattern 401d and the second stripe pattern 400d.

On the other hand, structure grids generated using the synthesis of one-dimensional (1D) stripes proposed in the present invention are better than structure grids generated using 2D texture synthesis. Further, $O(d^2(2r+1)^2)$ operations are necessary in every update operation for pixels when the 2D texture synthesis is performed. However, because $2 \times O(d(2r+1))$ operations are necessary in every update operation for pixels when the texture synthesis is performed using the 1D stripe pattern synthesis as proposed in the present invention, excellent performance is exhibited in terms of speed.

The first stripe patterns generated as described above are effective in effectively showing the vector field, and therefore can be used in flow visualization or the like as an example.

A structure grid G generated by the second generation unit 105 can be defined as an image $G:p \rightarrow (t_0, t_1)$ having a vector value. At this time, $t_0$ and $t_1$ respectively denote distances from a pixel p to the nearest grid lines in the direction information of a feature pixel and its vertical direction. This is aimed at improving synthesis results by including a larger amount of information in the entire pattern when information regarding a distance to a grid, not the presence/absence of a grid, for each pixel is provided, and using the distance information in a subsequent step. When a desired distance between neighboring grid lines in the structure grid generated by the second generation unit 105, that is, a dot or line interval in the resulting image, is d, $t_i$ may have a value in a range of [0, d/2] and is defined in a periodic reflection type to reflect a grid iterated at fixed intervals. In this case, dots are placed in a position of (0, 0) and hatching lines are placed in a position of $(t_0, 0)$ or $(0, t_1)$.

According to an embodiment of the present invention, the second generation unit 105 combines the first stripe pattern 401d of FIG. 4, which is the result obtained by iteratively synthesizing the stripe pattern according to the direction information of feature pixels, and the second stripe pattern 400d of FIG. 4, which is the result obtained by iteratively synthesizing the stripe pattern along a vertical direction with respect to the direction information of the feature pixels, thereby generating structure grids 400e and 400g of FIG. 4. For this, a stripe pattern P can be defined as an image P: $p \rightarrow t$ having a constant corresponding to one of two distance values $(t_0, t_1)$ defined for each pixel.

The stripe pattern P of the structure grid generated by the second generation unit 105 follows a vector field F or its vertical direction and has a grid spacing d. At this time, the stripe pattern P is synthesized by iteratively updating a distance value of P through a local optimization method.

For this, the second generation unit 105 defines initial values for stripe patterns of the structure grid. For example, because there is no explicit criterion for determining an initial value of P in the case of the stripe pattern along the vertical direction of the vector field F, the second generation unit 105 determines a random value in the range of [0, d/2] as the initial value of the stripe pattern P. On the other hand, the second generation unit 105 performs initialization using information regarding a distance to the nearest feature line for each pixel in the case of the stripe pattern in a direction of the vector field F.

For example, the second generation unit 105 can calculate the information regarding the distance to the nearest feature line for each pixel using a jump-flooding algorithm, and calculate the distance information having a real value in the range of [0, d/2] by performing conversion into a distance to the nearest grid line for each pixel using a periodic reflection function as shown in Equation (1).

$$S(x)=S(x+d)=\min(x,d-x) \ (0 \le x < d) \quad (1)$$

Referring to FIG. 5, the second generation unit 105 iteratively updates a value t of the stripe pattern P using a neighbor window W (502) having a size of (2r+1)×(2r+1) oriented in the vector field F or its vertical direction at the pixel p (501) on the basis of at least one pixel p (501) among pixels of an image so as to calculate an optimum value t of the stripe pattern P for at least one pixel p (501) among pixels of the received image. At this time, in general, a value d indicating a predetermined spacing between dots or a predetermined spacing between lines in the image is used as a value of r.

If the second generation unit 105 calculates an average pixel value of each row and defines a 1D array w (503) having a size of (2r+1), the 1D array, which is denoted by w[i], where i=−r, r, summarizes a current t value distribution of the stripe pattern P around the center pixel p (501). The second generation unit 105 can define an optimum value t for the pixel p by comparing the 1D array w (503) computed as described above to the function S serving as a goal of the stripe pattern. For this, the second generation unit 105 defines a template array 504, $s_x[i]=S(i+x)$, where i=−r, . . . , r (0≤x<d), that has the same size as w[i] through sampling from the function S serving as the goal of the stripe pattern, and finds a sampling position x value for minimizing $$E(w, s_X) = \sum_{i=-r}^{r} (s_X[i] - w[i])^2,$$

which is an element-by-element difference between the 1D array w (503) and a template array 504, while varying the sampling position x. However, in this case, because it is not possible to directly find an optimum value due to a min function defined from Equation (1) and included in $s_x[i]$, the range of x is divided into sub-ranges [m/2, m/2+0.5], where m=0, . . . , 2d−1. In each sub-range, the min function is removed from $s_x[i]$, and $E(w, s_x)$ is expressed as a simple quadratic function.

The second generation unit 105 calculates a value x having a smallest $E(w, s_x)$ value among smallest $E(w, s_x)$ values calculated in the sub-ranges. At this time, $s_x$ can be considered as a template array that best matches the pixel p (501) and its neighborhood information. Accordingly, the second generation unit 105 updates the current optimum value t for the pixel p (501) to a value $s_x[0]$ corresponding to the center of $s_x$. The second generation unit 105 iteratively performs a pixel-unit update operation for every pixel. The total number of iterations is between 3 and 8.

On the other hand, if the second generation unit 105 performs texture synthesis using the 1D stripe pattern synthesis proposed in the present invention, it is possible to additionally adjust a ratio of the neighbor window W (502) as well as the direction when the neighbor window W (502) is defined to update at least one pixel p (501) among pixels of an image.

When the second generation unit 105 adjusts the ratio of the neighbor window W (502) as described above, an area of neighboring pixels to be considered for at least one pixel p (501) among the pixels of the image is varied and consequently an interval of the stripe pattern is changed.

For the above reasons, the second generation unit 105 can gradually or smoothly adjust an interval between dots or lines in each part of the image, thereby generating a structure grid having a high degree of freedom like an image drawn by an artist. Hereinafter, the case where the rendering unit of the image processing apparatus renders primitives according to an embodiment of the present invention will be described with reference to FIG. 6.

Figure 6:
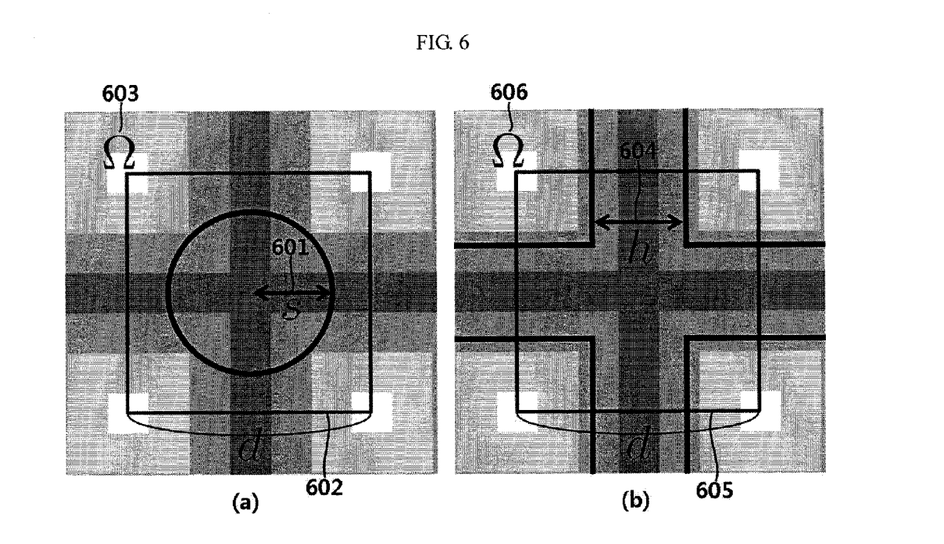
FIG. 6 is an exemplary diagram illustrating a process in which a rendering unit of the image processing apparatus renders primitives according to an embodiment of the present invention.

FIG. 6 is an exemplary diagram illustrating a process in which the rendering unit of the image processing apparatus renders primitives according to an embodiment of the present invention.

The rendering unit 107 receives the structure grid generated by the second generation unit 105, and renders primitives expressing predetermined tones on the received structure grid. Here, the primitive rendering is a process of creating a resulting image by drawing basic primitives such as dots or lines on the structure grid generated by the second generation unit 105.

The rendering unit 107 determines positions and sizes of the primitives to be rendered using a tone map generated from values on the structure grid and a tone map generated from the received image. At this time, the tone map generated from the image can be generated by converting the image into a grayscale version of an image and Gaussian smoothing the grayscale version of the image. The tone map is a map of tones to be expressed as a resulting image capable of being generated by performing image processing such as additional brightness or gamma adjustment for a result of the Gaussian smoothing.

On the other hand, a method of expressing stippling 300b in which dots are arranged at grid intersections on the structure grid having a grid structure is a method of drawing a circle in a position corresponding to a structure grid value (0, 0).

However, in this case, there is a problem in that a slight imperfection can be easily magnified if the resulting image is overly mechanical and the position is imperfect due to deformation of direction information of feature pixels. Dots actually drawn by hedcut artists have irregular shapes to generate a resulting image having a more natural and comfortable look even in deformation of the direction information of feature pixels.

According to an embodiment of the present invention for solving the above-described problem, the rendering unit 107 using the pixel-based stippling method estimates a position of a dot to which at least one pixel p among pixels of an image belongs, that is, a position of a dot nearest to a position of the pixel p.

At this time, information necessary for the rendering unit 107 to estimate whether or not the pixel p belongs to the dot nearest to the position of the pixel p is a distance from the pixel p to the nearest dot center and a size of the dot.

The rendering unit 107 can define the distance $d_s$ from the position of the pixel p to the nearest dot center as $d_s = \sqrt{t_0^2 + t_1^2}$ from the structure grid value, and define the dot size inversely proportional to a tone value. At this time, when an average tone in a region Ω (603) having a size of d (602)×d (602) having the center of a corresponding dot is denoted by b, b can be easily approximated to a tone map value at the pixel p in consideration of the smoothed tone map.

On the basis of this, when the rendering unit 107 calculates a dot size s (601) necessary to express a tone b in the region Ω (603) having the size of d (602)×d (602), Equation (2) is given. At this time, because dots overlap when the dot size s is larger than d/2, the rendering unit 107 should calculate the dot size s additionally considering the overlap.

$$1 - b = \frac{\pi s^2}{d^2}, \text{ that is, } s = d\sqrt{\frac{1-b}{\pi}} \quad (2)$$

In Equation (2), b denotes an average tone in the region Ω (603) having the size of d (602)×d (602) having the center of a dot nearest to the pixel p, s (601) denotes a dot size necessary to express the average tone in the region Ω (603), and d is a value indicating a predetermined interval between dots or hatching lines in a resulting image, that is, a structure grid interval.

The rendering unit 107 determines a brightness value of the pixel p by comparing the distance $d_s$ from the position of the pixel p to the nearest dot center with the dot size s. At this time, in order to prevent aliasing such as an uneven line, the rendering unit 107 defines a region corresponding to a boundary having a thickness of $\delta_s$ around a dot nearest to the position of the pixel p as a grayscale band. A brightness value of the pixel p is determined to be 0 by determining a region corresponding to a dot nearest to the position of the pixel p, for example, as a black region, if $d_s$ is less than $s-\delta_s$. The brightness value of the pixel p is determined to be 1 by determining a region not corresponding to a dot nearest to the position of the pixel p, for example, as a white region, if $d_s$ is greater than s.

In addition, the rendering unit 107 determines the brightness value of the pixel p as an interpolated grayscale value, $1-(s-d_s)/\delta_s$, in the region corresponding to the boundary having the thickness of $\delta_s$ around the dot nearest to the position of the pixel p, that is, in a region where $d_s$ has a value between $s-\delta_s$ and s, where the basic value of $\delta_s$ is 1.

On the other hand, according to an embodiment of the present invention for expressing hatching 300c in which lines are arranged on grid line portions on the structure grid having the grid structure, grid line portions in which $t_0$ and $t_1$ respectively denoting the distances from the pixel p to the nearest grid lines in the direction information of a feature pixel and its vertical direction in the structure grid are 0 can be connected and lines can be arranged and generated on the connected grid line portions.

However, in this case, there is a problem in that a slight imperfection can be easily magnified if the resulting image is overly mechanical and the position is imperfect due to deformation of direction information of feature pixels.

Using the pixel-based hatching method according to an embodiment of the present invention for solving the above-described problem, the rendering unit 107 estimates a position of a hatching line to which at least one pixel p among pixels of an image belongs, that is, a position of a hatching line nearest to a position of the pixel p.

At this time, information necessary for the rendering unit 107 to estimate whether or not the pixel p belongs to the hatching line nearest to the position of the pixel p is a distance from the pixel p to the nearest hatching-line center and a thickness of the line.

The rendering unit 107 can define a distance $d_h$ from the position of the pixel p to the nearest hatching-line center as $\min\{t_0, t_1\}$ from the structure grid value, and define the thickness of the hatching line inversely proportional to a tone value of the hatching line as in the stippling of FIG. 6.

At this time, when an average tone in a region Ω (606) having a size of d (605)×d (605) having the center of a corresponding dot is denoted by b, a thickness h (604) of the hatching line necessary to express the tone b in the region Ω (606) is calculated as shown in Equation (3).

$$b = \frac{(d-h)^2}{d^2}, \text{ that is, } h = d(1 - \sqrt{b}) \quad (3)$$

In Equation (3), b dentoes an average tone in the region Ω (606) having the size of d (605)×d (605) having the center of a dot nearest to the pixel p, and h (604) denotes a thickness of the hatching line necessary to express the average tone in the region Ω (606).

The rendering unit 107 determines a brightness value of the pixel p by comparing the distance $d_h$ from the position of the pixel p to the nearest hatching line with the line thickness h (604). At this time, in order to prevent aliasing such as an uneven line, the rendering unit 107 defines a region corresponding to a line boundary having a thickness of $\delta_h$ in a boundary of a line nearest to the position of the pixel p as a grayscale band. A brightness value of the pixel p is determined to be 0 by determining a region corresponding to a hatching line nearest to the position of the pixel p, for example, as a black region, if $d_h$ is less than $h-\delta_h$. The brightness value of the pixel p is determined to be 1 by determining a region not corresponding to the hatching line nearest to the position of the pixel p, for example, as a white region, if $d_h$ is greater than h.

In addition, the rendering unit 107 determines the brightness value of the pixel p as an interpolated grayscale value, $1-(h-d_h)/\delta_h$, in the region corresponding to the boundary having the thickness $\delta_h$ in a boundary of a hatching line nearest to the position of the pixel p, that is, in a region where $d_h$ has a value between $h-\delta_h$ and h, where the basic value of $\delta_h$ is 1.

When the rendering unit 107 performs rendering using the pixel-based primitive rendering method according to an embodiment of the present invention as described above, the rendering unit 107 can effectively create tones of a tone map while rendering naturally-shaped dots or lines by an independent arithmetic operation on pixels in a short time.

Because the stippling and hatching defined as described above are all generated on the basis of pixels on a structure grid having the same structure, there is no sense of incongruity even when a mixture 300d of two styles is made. Accordingly, it is possible to generate a result closer to a resulting image generated by an artist by mixing and expressing the two styles in actual rendering.

In general, hatching is preferred to stippling in which dots overlap when the artist expresses a dark area. For this reason, in an embodiment of the present invention, a maximum allowable dot size is defined as $s_{max}$, the stippling is performed in a region where the calculated dot size s is less than $s_{max}$, and the hatching is performed in a region where the calculated dot size s is greater than $s_{max}$, so that it is possible to use the stippling and the hatching in combination.

At this time, the basic value of $s_{max}$ is defined as d/2 corresponding to a dot size in which dots start to overlap, a resulting image can be generated by only hatching when a value of $s_{max}$ is defined as 0, and a resulting image can be generated by only stippling when a value of $s_{max}$ is defined as a large value in which the region Ω can be covered.

On the other hand, a dot shape or interval may be excessively deformed in a portion where a vector field such as singularity or the like is excessively varied in a structure grid generated by only the stippling. To improve the dot shape, a post-processing process can be performed to additionally improve the structure grid.

First, the post-processing unit (not shown) calculates, for example, local minima of $\sqrt{t_0^2 + t_1^2}$ corresponding to grid intersections of a structure grid in a corresponding region, and calculates a Voronoi diagram from the calculated local minima.

The post-processing unit can generate a modified structure grid G' by calculating distances from each pixel to the center of its Voronoi cell on the calculated Voronoi diagram in a feature direction and a direction vertical to the feature direction, and defining new $t_0$ and $t_1$ values.

At this time, in order to resolve the discontinuity of Voronoi cell boundaries, the post-processing unit can generate a structure grid G" re-defined by applying stripe pattern synthesis separately to $t_0$ and $t_1$ of the modified structure grid G'.

Finally, the post-processing unit can generate an updated structure grid wG'(p)+(1−w)G"(p) by defining a weight w inversely proportional to the distance from each pixel to the Voronoi cell center and calculating a weighted sum using the weight w.

When the modified structure grid is used through the above-described process, the rendering unit 107 can render dots effectively expressing tones in which a position or interval has a natural shape while being forced to a certain extent by reflecting the Voronoi cell center in the dot center. Because the rendering unit 107 performs an arithmetic operation using the jump-flooding algorithm for arithmetic operations related to the Voronoi diagram, a pixel-based process can be rapidly performed and therefore additional time consumption is almost absent.

Figure 7:
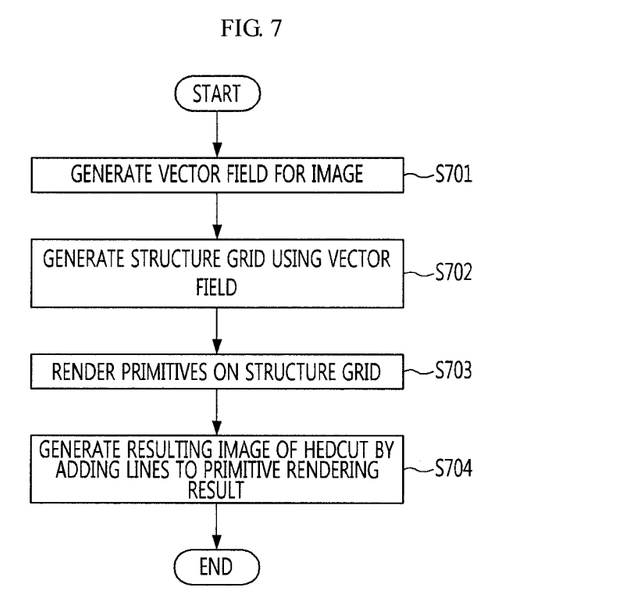
FIG. 7 is a flowchart illustrating an image processing process according to an embodiment of the present invention.

FIG. 7 is a flowchart illustrating an image processing process according to an embodiment of the present invention.

Referring to FIG. 7, the image processing apparatus generates a vector field for an image using feature pixels and direction information of the feature pixels in the received image (S701). Here, the image processing apparatus interpolates and uses direction information of feature pixels included in a feature line map so as to define direction information of feature pixels excluded from the feature line map. This is soft and stable as compared to the simple use of ETF information of all feature pixels included in an image, and can obtain a vector field highly reflecting information of a feature portion.

According to an embodiment of the present invention, the image processing apparatus can generate a vector field for an image by interpolating direction information of dots corresponding to a feature line map using multilevel B-spline interpolation among scattered data interpolation methods. According to an embodiment of the present invention, the image processing apparatus can interpolate each term after converting direction information of feature pixels into 2×2 structure tensors so as to process vectors indicating opposite directions, for example, (1, 0) and (−1, 0), in the same direction, calculate eigenvectors of the interpolated structure tensors, and generate a vector field for an image by definition in a direction of each pixel.

The image processing apparatus generates a structure grid using the vector field (S702). According to an embodiment of the present invention, the image processing apparatus can generate a structure grid having a grid structure by smooth deformation along the generated vector field. In this structure, all of stippling, hatching, and a mixture thereof can be expressed by drawing dots at grid intersections and lines on grid lines. Primitives drawn as described above can be arranged at fixed intervals along a feature direction and its vertical direction.

The image processing apparatus renders primitives expressing predetermined tones on the generated structure grid (S703). Here, the primitive rendering is a process of creating a final resulting image by drawing basic primitives such as dots or lines on the generated structure grid. The image processing apparatus generates a resulting image by adding feature lines to a primitive-rendered result (S704).

While the present invention has been described above with reference to the preferred embodiments, it will be understood by those skilled in the art that that various changes, substitutions and alterations may be made herein without departing from the spirit and scope of the invention as defined in the following claims.

The invention claimed is:

1. An image processing apparatus comprising:
    a first generation unit being operable to generate a vector field expressing the shape of an image using feature pixels of the image and direction information of the feature pixels;
    a second generation unit being operable to generate a structure grid indicating a structure for rendering the shape of the image using the vector field; and
    a rendering unit configured to render primitives expressing predetermined tones using the generated structure grid,
    wherein the structure grid is generated using a stripe pattern defined by synthesizing one dimensional deformed stripes on the image,
    wherein the second generation unit generates the structure grid by combining first stripe patterns which are results obtained by iteratively synthesizing a stripe pattern using direction information of feature pixels, and second stripe patterns which are results obtained by iteratively synthesizing the stripe pattern along a different direction with respect to the direction information of the feature pixels.

2. The image processing apparatus of claim 1, further comprising:
    an image generation unit being operable to generate a resulting image by adding feature lines representing features of the image to a result of primitive rendering.

3. The image processing apparatus of claim 1, wherein the first generation unit generates a vector field for the image by generating a feature line map corresponding to the feature pixels and interpolating direction information of feature pixels included in the generated feature line map.

4. The image processing apparatus of claim 1, wherein the second generation unit generates at least one stripe pattern iterated at fixed intervals along a direction using at least one vector field.

5. The image processing apparatus of claim 1, wherein the second generation unit defines the stripe pattern spaced a predetermined distance from at least one pixel among a plurality of pixels included in the image.

6. The image processing apparatus of claim 1, further comprising:
    a post-processing unit being operable to estimate positions corresponding to grid intersections and grid lines on the structure grid.

7. The image processing apparatus of claim 6, wherein the post-processing unit modifies the structure grid by revising the grid intersections and the grid lines corresponding to the estimated positions.

8. The image processing apparatus of claim 1, wherein the rendering unit determines positions and sizes of primitives to be rendered using values on the structure grid and a tone map generated on the basis of the image.

9. The image processing apparatus of claim 8, wherein the rendering unit renders primitives having predetermined sizes using distance from pixels to the nearest primitive centers, which are obtained from values of structure grid.

10. The image processing apparatus of claim 8, wherein the tone map is a map of tones to be expressed as the resulting image.

11. The image processing apparatus of claim 1, wherein the vector field is a vector indicating arrangement direction information of primitives to be rendered.

12. The image processing apparatus of claim 1, wherein the structure grid is a structure indicating position information of primitives to be rendered.

13. An image processing method to be performed in an image processing apparatus, comprising:
  generating a vector field expressing the shape of an image using feature pixels of the image and direction information of the feature pixels;
  generating a structure grid indicating a structure for rendering the shape of the image using the vector field; and
  rendering primitives expressing predetermined tones using the generated structure grid,
  wherein the structure grid is generated using a stripe pattern defined by synthesizing one dimensional deformed stripes on the image;
  wherein generating the structure grid includes combining first stripe patterns which are results obtained by iteratively synthesizing a stripe pattern using direction information of feature pixels, and second stripe patterns which are results obtained by iteratively synthesizing the stripe pattern along a different direction with respect to the direction information of the feature pixels.

14. The image processing method of claim 13, further comprising:
  generating a resulting image by adding feature lines representing features of the image to a result of primitive rendering.

15. The image processing method of claim 13, wherein generating the vector field includes:
  generating a vector field for the image by generating a feature line map corresponding to the feature pixels and interpolating direction information of feature pixels included in the generated feature line map.

16. The image processing method of claim 13, wherein generating the structure grid includes:
  generating at least one stripe pattern iterated at fixed intervals along a direction using at least one vector field.

17. The image processing method of claim 13, wherein generating the structure grid includes:
  defining the stripe pattern spaced a predetermined distance from at least one pixel among a plurality of pixels included in the image.

18. The image processing method of claim 13, further comprising:
  estimating positions corresponding to grid intersections and grid lines on the structure grid.

19. The image processing method of claim 18, wherein estimating the positions includes:
  modifying the structure grid by revising the grid intersections and the grid lines corresponding to the estimated positions.

20. The image processing method of claim 13, wherein rendering the primitives includes:
  determining positions and sizes of primitives to be rendered using values on the structure grid and a tone map generated on the basis of the image.

21. The image processing method of claim 20, wherein rendering the primitives includes:
  rendering primitives having predetermined sizes using distance from pixels to the nearest primitive centers, which are obtained from values of structure grid.

22. The image processing method of claim 20, wherein the tone map is a map of tones to be expressed as the resulting image.

23. The image processing method of claim 13, wherein the vector field is a vector indicating arrangement direction information of primitives to be rendered.

24. The image processing method of claim 13, wherein the structure grid is a structure indicating position information of primitives to be rendered.

* * * * *